United States Patent
Wang

(10) Patent No.: US 6,932,434 B2
(45) Date of Patent: Aug. 23, 2005

(54) EXTENSIONAL HUBCAP DOCKING STRUCTURE

(75) Inventor: Ming-Fang Wang, Tainan Hsien (TW)

(73) Assignee: Kuan Hsings Enterprise Corp., Tainan Hsien (TW)

( * ) Notice: Subject to any disclaimer, the term of this patent is extended or adjusted under 35 U.S.C. 154(b) by 0 days.

(21) Appl. No.: 10/459,578

(22) Filed: Jun. 12, 2003

(65) Prior Publication Data

US 2004/0251733 A1 Dec. 16, 2004

(51) Int. Cl.[7] .............................. B60B 7/00; B60B 7/12; B60B 7/10
(52) U.S. Cl. .............................. 301/37.102; 301/37.33; 301/37.34
(58) Field of Search ....................... 301/37.101, 37.102, 301/37.31–37.34, 37.106, 37.42

(56) References Cited

U.S. PATENT DOCUMENTS

| 4,229,047 A | * | 10/1980 | Beisch | 301/37.42 |
| 5,718,484 A | * | 2/1998 | Sheu | 301/37.33 |
| 6,059,375 A | * | 5/2000 | Shryock | 301/37.34 |
| 6,575,537 B1 | * | 6/2003 | Wang | 301/37.23 |
| 6,688,703 B1 | * | 2/2004 | Wang | 301/37.23 |
| 6,726,290 B1 | * | 4/2004 | Yue | 301/37.23 |
| 6,860,568 B2 | * | 3/2005 | Nunes | 301/37.23 |

* cited by examiner

Primary Examiner—Russell D. Stormer
Assistant Examiner—Jason R. Bellinger
(74) Attorney, Agent, or Firm—Bacon & Thomas

(57) ABSTRACT

An extensional hubcap docking structure. The structure includes anchoring mounts positioned on the back surface of a hubcap. Clip components are coupled onto the anchoring mounts, and elastic components are situated between each hubcap anchoring mount and clip component. When the hubcap is fully installed onto the wheel of a tire and the hubcap is subjected to an outward force that subsequently pulls the anchoring mounts, the elastic components compress and rebound such that the hubcap is kept safely and tightly positioned on the wheel rim.

3 Claims, 3 Drawing Sheets

EXTENSIONAL HUBCAP DOCKING STRUCTURE

BACKGROUND OF THE INVENTION

1) Field of the Invention

The invention herein relates to automotive parts and accessories, specifically an extensional hubcap docking structure in which a hubcap so-equipped installed on the wheel rim of a tire is capable of an appropriate degree of spring-loaded extension when subjected to outward force to thereby prevent hubcap damage.

2) Description of the Related Art

As indicated in FIG. 1, a conventional hubcap 1 typically consists of a round contoured surface 11 having a plurality of differently shaped reticulations 12 and a plurality of clip members 13, each having a crook 14 at their free extremities, that are arrayed at equal intervals apart on the back surface of the hubcap 1, with the crooks 14 attached on a steel ring 15. The steel ring 15 is configured to insertionally retain all of the clip members 13 along the outer diameter of a wheel 2.

Since the purpose of such a conventional hubcap 1 is to conceal the unattractive wheel 2, the design of the round contoured surface 11 is such that its outer diameter is equal to or slightly smaller than the circumferential extent of the rim 21, which only accomplishes the objective of covering the wheel 2. However, motor vehicles are not all means of transportation and the wheels 2 on which their tires 3 are mounted do not only facilitate the rotation of the tire 3, many vehicle drivers often replacing original 13-inch wheels 2 with those of 14-inch specifications or move up from 14-inch to 15-inch ones in hopes of increasing mileage for the same number of revolutions. But given the wheel well area limitations of vehicle chassis, tire size cannot be increased indefinitely. Consequently, vehicle horsepower and torque allowing, as wheel dimensions are increased, if the maximum diameter at the tread pattern of a tire does not change, then the tire becomes correspondingly thinner, and many drivers are more interested in these thinner, low-profile tires. Even so, the desire for such tires of lesser thickness cannot be fulfilled for every driver unless a vehicle's engine is modified to achieve greater horsepower because the horsepower and torque of most vehicles at the time of factory release often does not allow for replacement wheels of larger dimensions. As a result, a hubcap having a radially expandable, round contoured surface was invented, the radially variable circumference of which exceeds that of the wheel rim and affords sufficient width to cover wheels with thicker tires and, furthermore, giving them a thinner appearance. However, there is no consideration for situations when the said hubcap is subjected to outward force due to insufficient tire pressure and direct physical impact.

SUMMARY OF THE INVENTION

The objective of the invention herein is to provide an extensional hubcap docking structure comprised of anchoring mounts disposed on the back surface of a hubcap, clip components coupled onto the anchoring mounts, and elastic components situated between each said hubcap anchoring mount and said clip component. Given this arrangement, when the said hubcap is fully installed onto the wheel of a tire and, furthermore, the said hubcap subjected to an outward force that subsequently pulls the said anchoring mounts, the said elastic components compress and rebound such that the hubcap is kept safely and tightly positioned on the wheel rim.

BRIEF DESCRIPTION OF THE DRAWINGS

Other features and advantages of the present invention will become apparent in the following detailed description of the preferred embodiments, with reference to the accompanying drawings, in which.

DETAILED DESCRIPTION OF THE PREFERRED EMBODIMENTS

Figure 1:
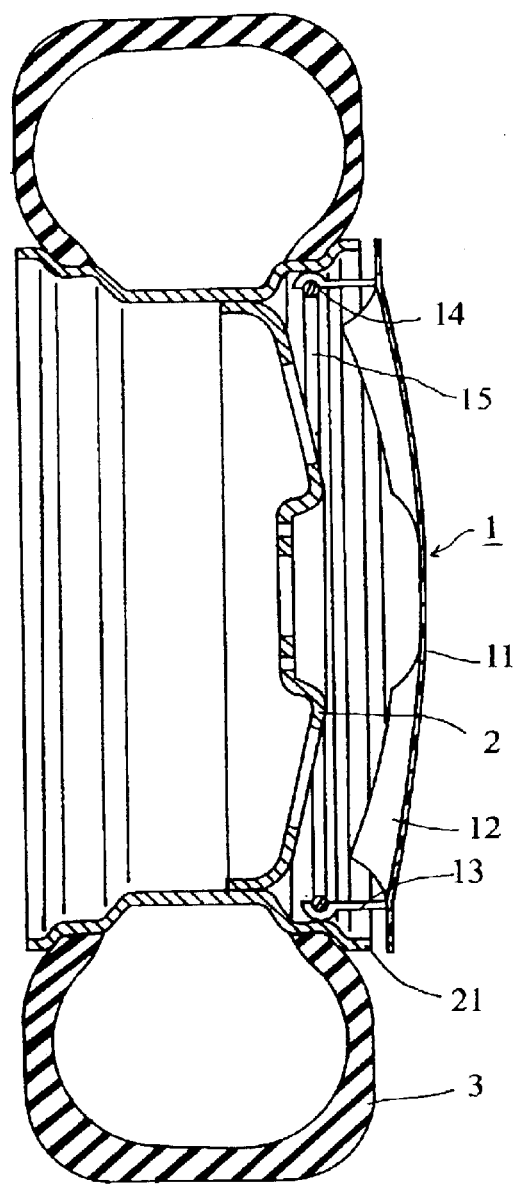
FIG. 1 is a cross-sectional drawing of a conventional tire mounted on a wheel.

In the detailed description of the preferred embodiments, identical elements are indicated by the same reference numerals throughout the disclosure.

Figure 2:
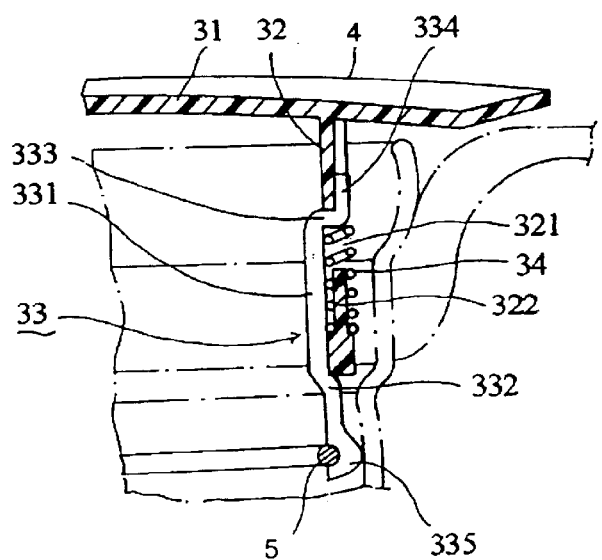
FIG. 2 is a cross-sectional drawing of the preferred embodiment clip structure of the invention herein.
Figure 3:
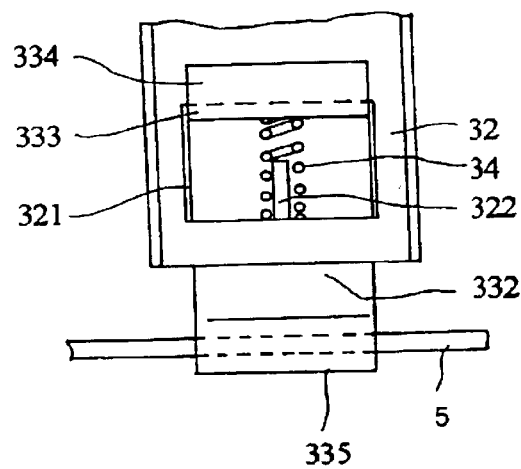
FIG. 3 is an orthographic drawing of FIG. 2, the partial section shown as viewed from the right side.
Figure 4:
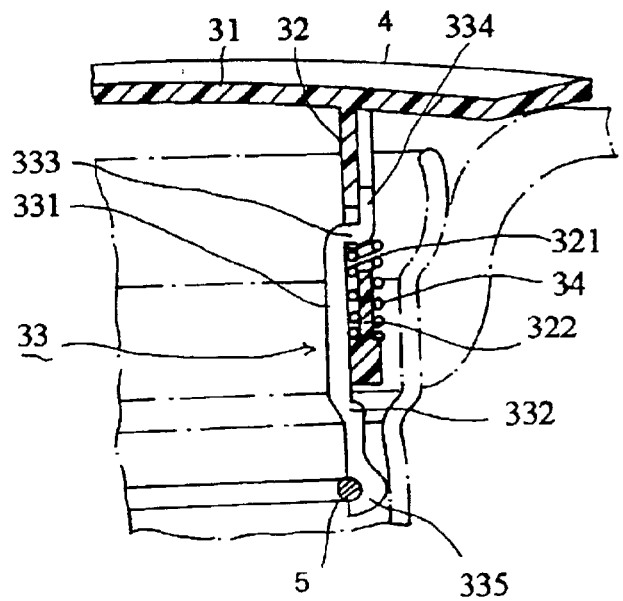
FIG. 4 is a cross-sectional drawing that illustrates the elastic movement of the preferred embodiment clip component of the invention herein.

Referring to FIG. 2 and FIG. 3, the preferred embodiment hubcap of the invention herein has numerous structural components that are totally identical and, therefore, only a single structure will be elaborated below; the preferred embodiment docking structure of the invention herein consists of a hubcap 4, the back surface 31 of which has disposed:

An anchoring mount 32, has an extent and an opening 321 formed in the anchoring mount along its extent, with a pin 322 situated at one interior lateral end and facing the opposite end of the opening 321.

A clip component 33 consisting of a backing seat 331, an inset seat 332 articulated by bending at one end of the backing seat 331, a support seat 333 bent at the other end, a check seat 334 formed immediately thereafter, and a latch seat 335 contoured into the inset seat 332.

The pin 322 in the opening 321 of the anchoring mount 32 has a spring configuration elastic component 34 sleeve onto it, and the other extremity of the elastic component 34 is situated against the support seat 333 of the clip component 333.

Installation of the preferred embodiment of the invention herein involves angling the clip component 33 check seat 334 and support seat 333 through the opening 321, following which the clip component 33 is aligned such that the backing seat 331 is against the inner side of the anchoring mount 32, at which time the clip component 33 inset seat 332 engages the distal extremity of the anchoring mount 32, enabling the lengthwise conjoinment of the clip component 33 to the anchoring mount 32; one extremity of the elastic component 34 is then admitted through the anchoring mount 32 opening 321 and sleeved onto the pin 322, while the other extremity is postured against the clip component 33 support seat 333; and, as is the case for conventional hubcaps, the latch seats 335 of a plurality of circularly arrayed clip components 33 are affixed to a steel ring 5; as such, when installed onto the wheel rims and tire pressure is insufficient, the tire flattens, and is drawn outward laterally, the resultant moment of force the hubcap is subjected to shifts the anchoring mounts 32 slightly, causing the compression of the elastic components 34 on the pin 322 situated between the support seats 33 and the anchoring mounts 32 such that the clip component 33 remains attached to the inner edge of the wheel, thereby keeping the hubcap 4 safely and tightly positioned on the wheel.

The hubcap clip structure of the preferred embodiment is of a simple arrangement that prevents hubcap dislodging when tire pressure is insufficient or when a flattened tire is drawn outward laterally and, at the same time, since the said extensional structure is itself of a straightforward clasping design, the design of an appropriate hubcap does not necessitate an excessive quantity of additional parts and increased complexity, which also affords packaging material and installation advantages.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

What is claimed is:

1. An extensional hubcap docking structure comprising:

an anchoring mount disposed on the back surface of a hubcap and a clip component coupled onto the anchoring mount, said anchoring mount defining an extent and an opening situated along said extent; and an elastic component situated between said anchoring mount and said clip component said elastic component exerts a force directed along said extent; wherein:

when the hubcap is fully installed onto a wheel of a tire and the hubcap is subjected to an outward force said elastic component compresses as a result of said outward force and rebounds such that the hubcap is kept safely and tightly positioned on the wheel rim of the wheel; and said clip component comprises a backing seat, an inset seat formed by bending at one end of said backing seat, a support seat formed by bending at the other end of said backing seat, a check seat extending outwardly from said support seat, and a latch seat extending from said inset seat.

2. The extensional hubcap docking structure as claimed in claim 1, wherein said elastic component is positioned between said anchoring mount opening and said clip component support seat.

3. The extensional hubcap docking structure as claimed in claim 2, wherein said elastic component is sleeved onto a pin inside said anchoring mount opening.

* * * * *